W. L. COLLINS & P. D. & W. K. SHEPPARD.
SWINGLETREE.
APPLICATION FILED MAY 11, 1909.
950,438.
Patented Feb. 22, 1910.
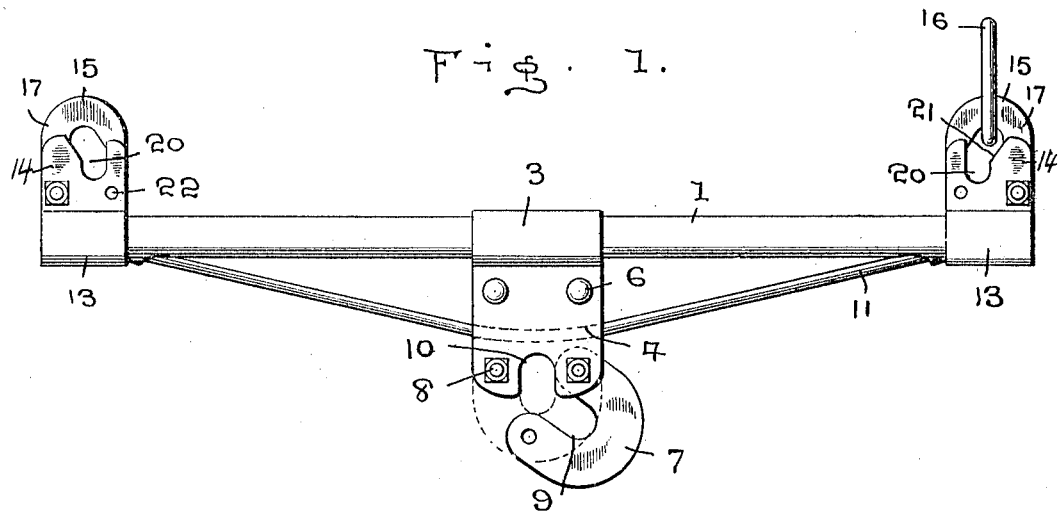
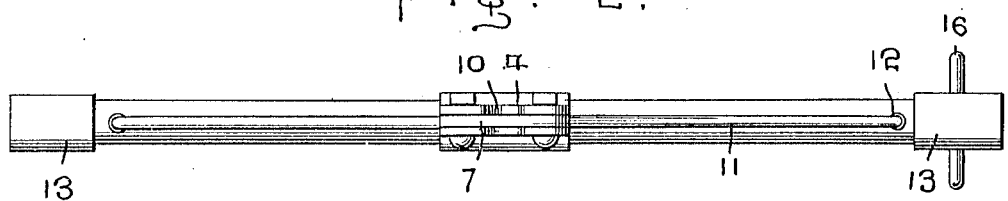
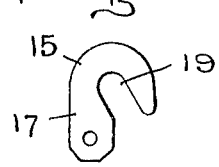 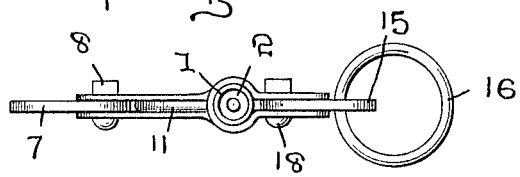
WITNESSES:
INVENTORS
W. L. Collins
P. D. Sheppard
W. K. Sheppard
BY
W. T. Fitzgerald
Attorneys

UNITED STATES PATENT OFFICE.

WILLIAM L. COLLINS, PEARL D. SHEPPARD, AND WAYNE K. SHEPPARD, OF CAIRO, WEST VIRGINIA.

SWINGLETREE.

950,438.

Specification of Letters Patent.   Patented Feb. 22, 1910.

Application filed May 11, 1909. Serial No. 495,282.

*To all whom it may concern:*

Be it known that we, WILLIAM L. COLLINS, PEARL D. SHEPPARD, and WAYNE K. SHEPPARD, citizens of the United States, residing at Cairo, in the county of Ritchie and State of West Virginia, have invented certain new and useful Improvements in Swingletrees; and we do hereby declare the following to be a full, clear, and exact description of the invention, such as will enable others skilled in the art to which it appertains to make and use the same.

Our invention relates to new and useful improvements in swingle trees and our object is to provide a device of this class which will be strong and durable in construction and light in weight.

A further object is to provide means for attaching a swingle tree to a double tree or similar object and a still further object is to provide means for attaching a tug or trace to the ends of the swingle tree.

Other objects and advantages will be hereinafter referred to and more particularly pointed out in the claim.

In the accompanying drawings forming part of this application, Figure 1 is a plan view of our improved swingle tree complete. Fig. 2 is an edge elevation thereof. Fig. 3 is an end elevation of the swingle tree, and, Fig. 4 is a plan view of one of the trace hooks removed from the swingle tree.

Referring to the drawings in which similar reference numerals designate corresponding parts throughout the several views, 1 indicates the bar of our improved swingle tree, which is preferably constructed of hollow piping, the ends of which are closed by means of caps 2.

Secured at the longitudinal center of the bar 1 is a clip 3, the tubular portion of which terminates in parallel ears 4, between which is located in practice a filler block, the block being held in position between the ears and the clip securely clamped on the bar by extending rivets or the like 6 through the ears and such filler block. The ears 4 extend beyond the filler block and have fixed between the extended portions, a clevis 7, the ends of which are secured between the ears by means of bolts 8, the recess 9 between the arms of the clevis communicating with a recess 10 in the ends of the ears to form an opening for the reception of a link or other parts of the double tree (not shown) and it will be readily seen that when the link is seated in said opening and both ends of the clevis secured by the bolts, the swingle tree will be securely held in position on the double tree.

A truss rod 11 is extended from end to end of the bar 1, the ends of said rod extending through openings 12 in the wall of the bar and through the caps 2, where they are secured in any suitable manner as by being upset, the rod in its passage from end to end of the bar, being extended between the ears 4 and over the end of the filler block, thereby disposing the central portion of the rod a distance from the face of the bar and forming a perfect brace for the bar, as the strain therein will be minimized by the rod.

Applied to the extreme ends of the bar 1 are auxiliary clips 13, terminating in the ears 14, between and to which are pivotally connected hooks 15, 17, to receive the ends of the traces 16, or rings, as shown, the pivotal connections between said hooks and said ears being effected by means of bolts 18. The hooks 15, 17 are each formed with a beak having its inner wall 19 inclined laterally and inwardly, the inner end of the inclined wall thus formed terminating at a point near to a line passing through the hook and the pivotal point thereof, said hook being thus formed with a throat at the inner end of said inclined wall whereby it will be noted that as stress is delivered upon the trace, or tug, the pulling strain will be substantially parallel with a line passing through the pivot of the hook and thus prevent the lateral displacement or unlocking of the hook. The ears 14 are formed with opposite slots, or recesses, 20, the general trend of which is in the direction of the longitudinal axis of the ears, the inner wall of each of said recesses, however, being inclined toward the throat of the hook and the outer ends of said ears, as at 21, the inclination of which is parallel with the inclination of the inner wall of the beak 19 of the hook, whereby as stress is delivered upon the trace or tug, the engaging link of the latter will be directed diagonally into the throat of the hook in order to aid in concentrating the pulling strain upon the hook at a point contiguous to a line passing through the pivot of said hook, as above stated. It is also noted that by reason of this construction and arrangement of parts the hook can be freely swung laterally to release the ring after the ring is seated in the closed end of the slot 20. The ears 14 are also provided with extra holes 22 through which may be introduced a bolt when it is desired to use a clevis in connection with the auxiliary clips.

It will thus be seen that we have provided a very cheap and durable form of swingle tree and one that is securely braced against bending when strain is directed against the ends thereof and it will be likewise seen that when the clevis is properly attached to a double tree or the like and the bolts placed in position, it will be impossible to release the swingle tree until one of the bolts is again removed. It will further be seen that in view of the construction of the hook and slot therein, the ends of the trace will be securely held in engagement with the hooks and prevented from disengagement therewith regardless of the position of the draft animals and while we have shown and described the device as a swingle tree, it will be readily understood that the various attachments may be employed in connection with a neck yoke and that the swingle tree may be used in connection with whiffle trees and other devices of a similar nature. It will likewise be readily understood that the clip at the center of the bar and the auxiliary clips at the ends thereof may be used with a swingle tree or other object constructed of wood or steel as the occasion may require, the manner of attaching said clips, peculiarly adapting the same for this purpose.

What we claim is:

A swingle tree having clips at the ends thereof, said clips having parallel ears provided with recesses, the general trend thereof being in the direction of the longitudinal plane of the clips, one wall of each of the recesses in each ear being inclined outwardly and laterally and a hook having its shank pivoted between said ears, and having a beak, the inner wall of which beak is inclined laterally and inwardly, about parallel with the inclined walls of said recesses, said inclined walls of the beak and recesses being distant from each other and the inclined wall of the beak being arranged forward of the inclined walls of said recesses, the outer terminals of the inclined walls of said recesses being at a point near a line passing through the pivotal point of connection between said hook and ears.

In testimony whereof we have signed our names to this specification in the presence of two subscribing witnesses.

WILLIAM L. COLLINS.
PEARL D. SHEPPARD.
WAYNE K. SHEPPARD.

Witnesses:
H. O. DAVIS,
GEO. H. FORTNER.